United States Patent
Kapur

(10) Patent No.: US 7,724,059 B2
(45) Date of Patent: May 25, 2010

(54) CLOCK SCALING CIRCUIT

(75) Inventor: Mohit Kapur, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 1151 days.

(21) Appl. No.: 10/978,183

(22) Filed: Oct. 29, 2004

(65) Prior Publication Data

US 2006/0091928 A1    May 4, 2006

(51) Int. Cl.
*G05F 1/04* (2006.01)
*H03K 3/00* (2006.01)
(52) U.S. Cl. ........................ 327/299; 327/115
(58) Field of Classification Search ................. 327/291, 327/299, 115, 117
See application file for complete search history.

(56) References Cited

U.S. PATENT DOCUMENTS

| | | | |
|---|---|---|---|
| 4,853,653 A | 8/1989 | Maher | 331/49 |
| 4,965,524 A | 10/1990 | Patchen | 327/99 |
| 4,970,405 A | 11/1990 | Hagiwara | 327/145 |
| 5,315,181 A | 5/1994 | Schowe | 326/93 |
| 5,537,062 A | 7/1996 | Mote, Jr. | 326/93 |
| 5,623,223 A | 4/1997 | Pasqualini | 327/298 |
| 5,652,536 A | 7/1997 | Nookala et al. | 327/298 |
| 5,808,485 A | 9/1998 | Goff et al. | 327/20 |
| 6,437,624 B1 * | 8/2002 | Kojima et al. | 327/211 |
| 6,466,073 B1 * | 10/2002 | Yukinari et al. | 327/291 |
| 6,667,704 B1 * | 12/2003 | Grale et al. | 341/123 |

FOREIGN PATENT DOCUMENTS

JP    2003216268 A  *  7/2003

OTHER PUBLICATIONS

U.S. Appl. No. 10/650,222, filed Aug. 28, 2003, M. Kapur et al.

* cited by examiner

*Primary Examiner*—Quan Tra
(74) *Attorney, Agent, or Firm*—Anne V. Dougherty; Ryan, Mason & Lewis, LLP

(57) ABSTRACT

Techniques for scaling and switching clocks in a glitch-free manner are provided. For example, in one aspect of the present invention, a technique for switching a frequency associated with a master clock includes the following steps/operations. Two phase clocks are generated from a master clock, wherein the two phase clocks do not transition at substantially the same time. Then, one of the two phase clocks is used to create multiple frequencies by dividing the one phase clock, and the other phase clock is used to switch between the multiple frequencies of the one phase clock. Further, one of the two phase clocks may be in phase with the master clock and the other of the two phase clocks may be 180 degrees out of phase with the master clock such that they do not transition at the same time. Also, the two phase clocks may be non-overlapping.

21 Claims, 6 Drawing Sheets

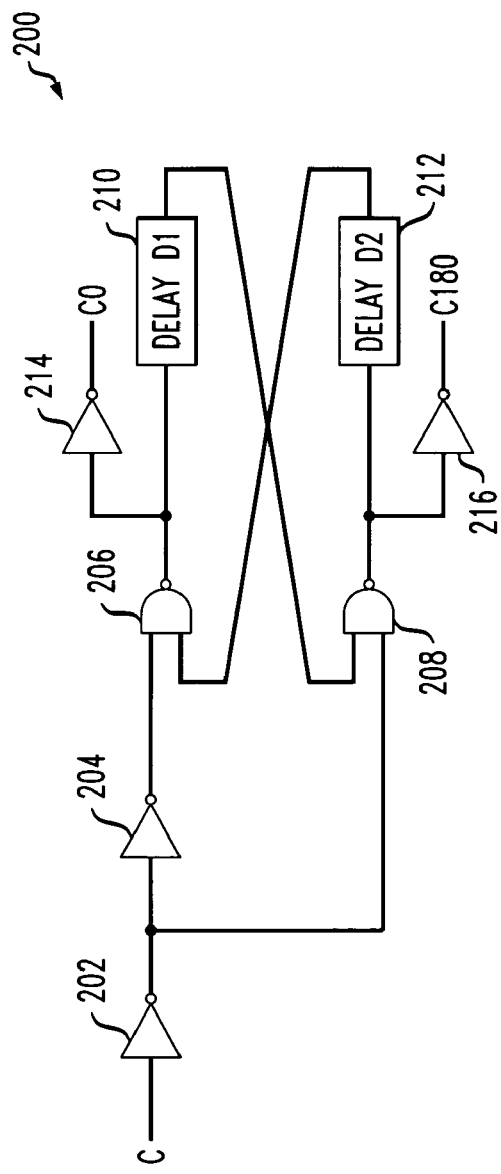
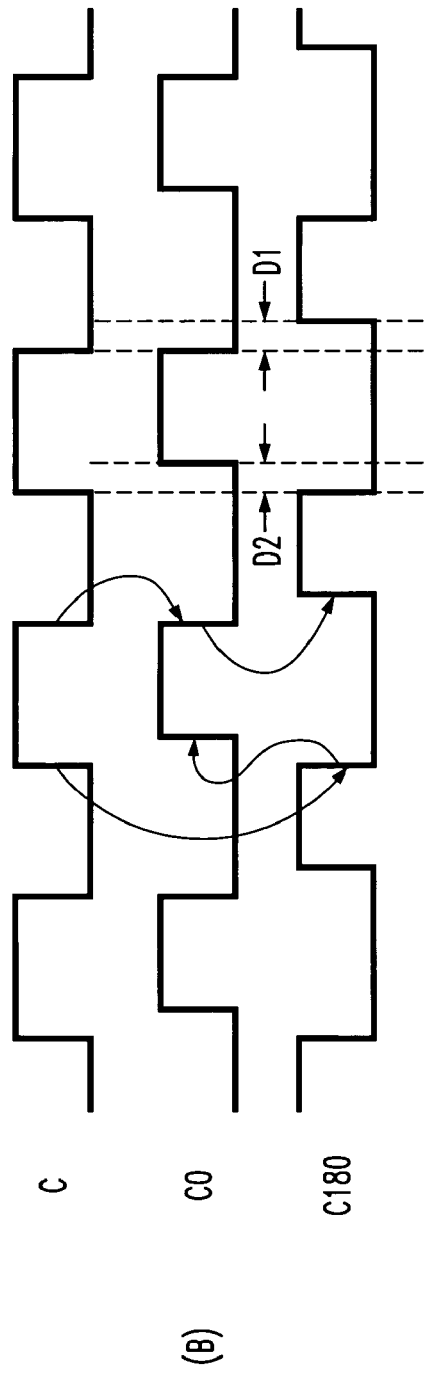
FIG. 2

FIG. 3
(A)
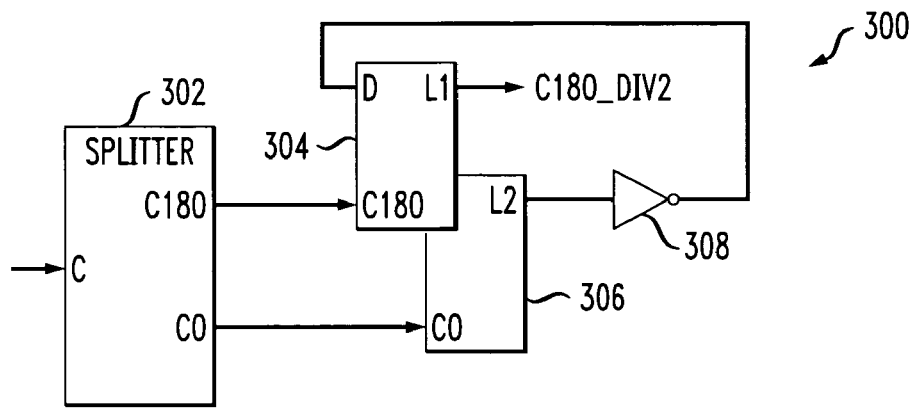
(B)
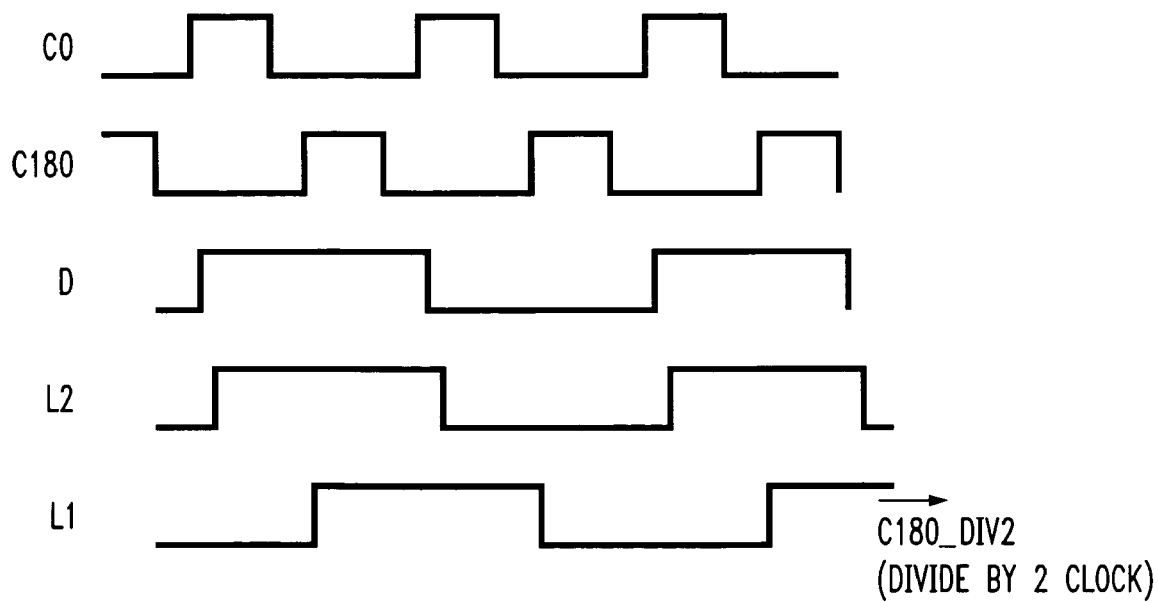

CLOCK SCALING CIRCUIT

FIELD OF THE INVENTION

The present invention generally relates to low power circuits, built in self test circuits and, more particularly, to clock generation and scaling circuits.

BACKGROUND OF THE INVENTION

Low power applications, as well as certain high performance applications, typically require a slowing down of the system clock by dividing the system clock and switching the circuit to a low frequency clock, and then back to a higher frequency, as required by the application.

Such clock switching circuits are also used in built in self test (BIST) circuits for dynamic fault detection. These BIST circuits determine the optimum clock frequency at which the associated circuit under test can be run error-free.

This switching of clock lines from one frequency to another is called clock scaling and is typically done "on the fly" without turning off the circuit. However, this switching may cause glitches on clock lines resulting in malfunctioning of the circuit.

Techniques for clamping and introducing multi-cycle dead time between clock switching have been proposed, see, e.g., U.S. Pat. Nos. 4,853,653, 4,965,524, 4,970,405, 5,315,181, 5,537,062, 5,652,536, 5,808,485 and 5,623,223. However, introducing multi-cycle dead time is inappropriate for certain applications, such as built in self test circuits. The amount of dead time in these circuits is dependent on the number of clocks to be switched and the period of the lowest frequency clock.

SUMMARY OF THE INVENTION

Principles of the present invention provide techniques for scaling and switching clocks in a glitch-free manner. The inventive principles also provide for using such techniques for dynamic fault detection.

For example, in one aspect of the present invention, a technique for switching a frequency associated with a master clock includes the following steps/operations. Two phase clocks are generated from a master clock, wherein the two phase clocks do not transition at substantially the same time. Then, one of the two phase clocks is used to create multiple frequencies by dividing the one phase clock, and the other phase clock is used to switch between the multiple frequencies of the one phase clock.

The technique may further include selecting one of the multiple frequencies of the one phase clock, such that the frequency associated with the master clock is switched to the selected frequency. Selection may be programmable. The technique may further include outputting a new master clock signal at the selected frequency.

Further, one of the two phase clocks may be in phase with the master clock and the other of the two phase clocks may be 180 degrees out of phase with the master clock such that they do not transition at the same time. Also, the two phase clocks may be non-overlapping.

Still further, the master clock may be switched from one clock frequency to a new clock frequency within half the period of the new clock frequency. The frequency of the master clock may be switched in order to detect at least one dynamic fault. Also, circuits may be sorted as a function of operating frequency based upon dynamic fault detection.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2A is a diagram illustrating a clock splitter circuit, according to an embodiment of the present invention;

FIG. 2B is a diagram illustrating timing associated with the clock splitter circuit of FIG. 2A;

FIG. 3A is a diagram illustrating a clock divider circuit, according to an embodiment of the present invention;

FIG. 3B is a diagram illustrating timing associated with the clock divider circuit of FIG. 3A;

DETAILED DESCRIPTION OF PREFERRED EMBODIMENTS

Figure 1:
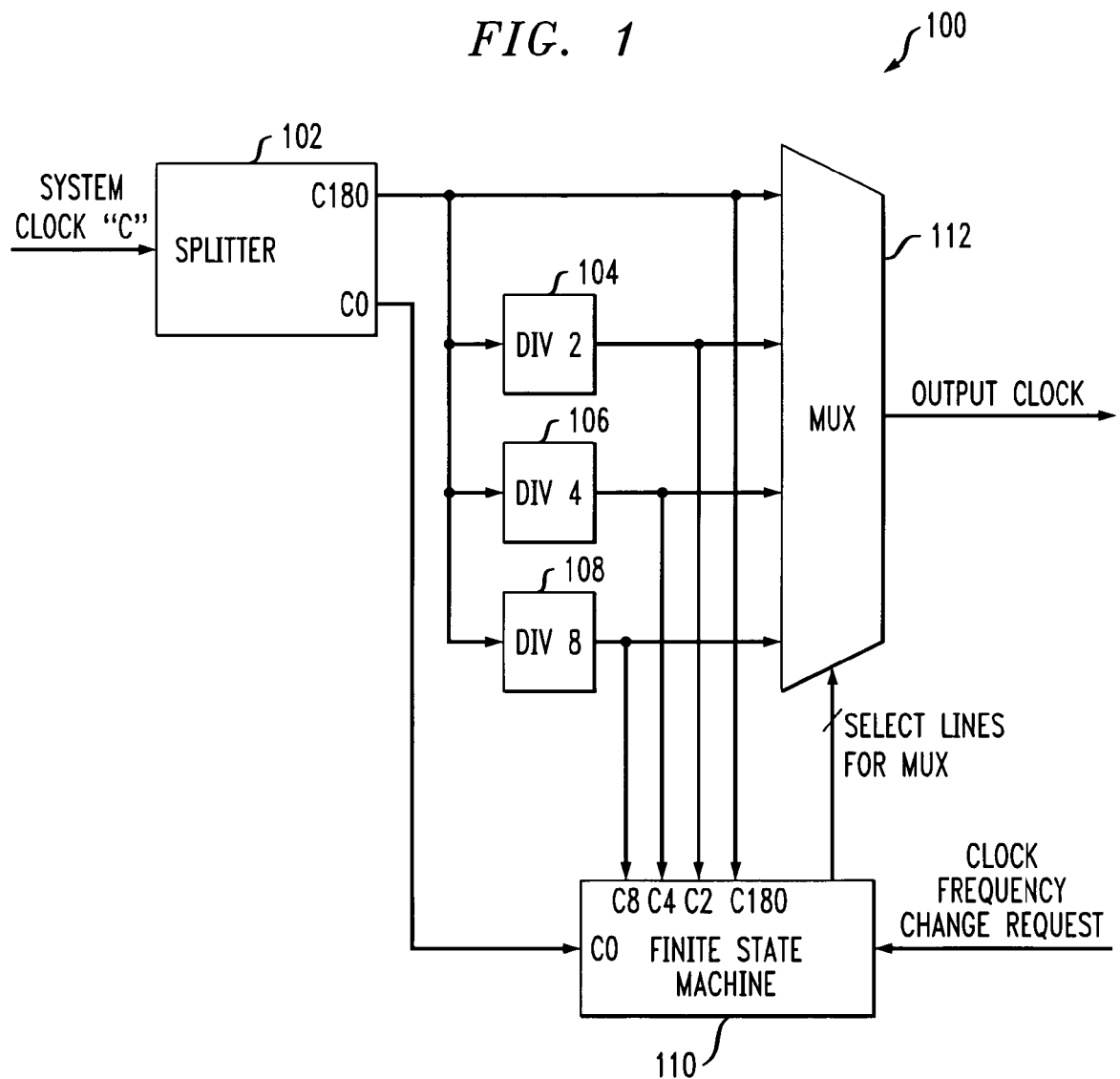
FIG. 1 is a diagram illustrating a frequency clock signal generation and switching circuit, according to an embodiment of the present invention.

Referring initially to FIG. 1, a diagram illustrates a frequency clock signal generation and switching circuit, according to an embodiment of the present invention. In general, the circuit shown in FIG. 1 may also be referred to herein as a clock scaling circuit.

More particularly, FIG. 1 depicts a circuit for sub-system frequency clock signal generation and switching in a glitch-free manner. As shown, circuit 100 includes a clock splitter 102, clock divide-by-2 circuit 104, clock divide-by-4 circuit 106, clock divide-by-8 circuit 108, finite state machine 110, and multiplexer 112.

In accordance with principles of the invention, circuit 100 generates two clock signals (e.g., C0 and C180) from the system clock (C) which needs to be scaled or divided. The new clock signals C0 and C180 are 180 degrees out of phase from each other. C0 is designed to be in phase with C and C180 is designed to be out of phase with C. This operation can be achieved using clock splitter 102. Illustrative details of a clock splitter circuit, according to an embodiment of the invention, are described below in the context of FIGS. 2A and 2B.

Circuit 100 then uses C180 to generate various divided frequencies as required by the application, represented by C 180_div2 (divide-by-2), C 180_div4 (divide-by-4), and C180_div8 (divide-by-8). It is to be appreciated that the invention is not limited to a number of divided clock signals (i.e., more or less divided clock signals than shown can be generated). This operation can be achieved using clock dividers 104, 106, and 108, respectively. Illustrative details of a clock divider circuit, according to an embodiment of the invention, are described below in the context of FIGS. 3A and 3B.

Circuit 100 also expects static inputs from other parts of system, requesting a change in frequency. By way of example only, these inputs can come from a power control macro requesting a lower frequency of operation to save power or from a BIST circuit requesting a lower frequency after detecting dynamic faults.

Circuit 100 then uses a finite state machine 110 which operates on C0 and evaluates the divided versions of C 180 to generate control signals for multiplexer 112. Illustrative details of state machine 110 are described below in the context of FIG. 4.

Multiplexer 112, based on control signals (which are now phase matched to C0), selects various versions of C180.

Advantageously, as these generated clock phases are 180 degrees apart, the problem of glitching never arises. Glitching arises when the clock switching circuit and the clock to be switched, transition at the same time. Principles of the invention ensure that C0, the switching clock, is always out of phase from C180 and its divided versions, thus ensuring that they do not transition at the same time. Another margin of safety is added by the clock splitter, since the splitter ensures that C0 and C180 are non-overlapping. Also, using principles of the invention, one need not introduce any dead time or clamp the clock line.

Thus, in accordance with principles of the invention, a circuit is provided to scale the frequency without creating glitches, obtained through generating two phase clocks from a master clock; one in phase and the other 180 degrees out of phase with the master clock. Then, one of the generated phases is used to create multiple frequencies by dividing it and the other phase is used to switch between the divided versions of the first phase based on a programmable selection. As will be further evident, principles of the invention also provide a circuit which switches from one clock frequency to a new clock frequency within half the period of the new clock frequency.

Referring now to FIG. 2A, a diagram illustrates a clock splitter circuit, according to an embodiment of the present invention. Further, FIG. 2B is a diagram illustrating timing associated with the clock splitter circuit of FIG. 2A. It is to be appreciated that the circuit in FIG. 2A represents one illustrative implementation of clock splitter 102 (FIG. 1). However, the invention is not limited to any particular implementation.

As shown clock splitter circuit 200 includes inverter 202, inverter 204, NAND gate 206, NAND gate 208, delay unit 210, delay unit 212, inverter 214, and inverter 216.

Consider the steady state condition when C='0', resulting in C0='0' (logic zero) and C1='1' (logic one). Now when C transitions from '0' to '1', C180 will transition from a '1' to '0' after the gate delay caused by 208 and 216. This will also cause C0 to transition much later, from a '0' to '1' after gate delay caused by 212, 206 and 214. This is shown in the timing diagram (FIG. 2B) as "D2". When C transitions from a '1' to '0', C0 transitions from a '1' to '0' after a delay caused by 206 and 214. Whereas, C180 transitions much later, after the delay caused by 210, 208 and 216. This is referred to in the timing diagram (FIG. 2B) as D1. Thus, the output clocks C0 and C180 are 180 degrees apart. C0 is in phase with C. C180 is 180 degrees out of phase with C.

Further, delay blocks 210 and 212 always ensure a non-overlap period of D1 and D2 between C0 and C180. This non-overlap between C0 and C180 provides an extra guard window which prevents any glitch to occur in selected clock. Such a non-overlapping effect is depicted in the timing diagram of FIG. 2B.

Referring now to FIG. 3A, a diagram illustrates a clock divider circuit, according to an embodiment of the present invention. Further, FIG. 3B is a diagram illustrating timing associated with the clock divider circuit of FIG. 3A. It is to be appreciated that the circuit in FIG. 3A represents one illustrative implementation of divide-by-2 circuit 104 (FIG. 1). However, the invention is not limited to any particular implementation. Also, it is to be understood that, given the teachings herein, one ordinarily skilled in the art would realize how to implement circuits providing a divide-by-4 function (106 of FIG. 1), a divide-by-8 function (108 of FIG. 1), and so on.

As shown clock divider circuit 300 includes a clock splitter 302, an LSSD (level sensitive scan design) latch formed by latches 304 and 306, and inverter 308. It is to be understood that clock splitter 302 may be implemented as shown in FIG. 2A.

The splitter block 302 generates two clock phases, as explained above. The generated clocks C180 and C0 drive D type latches L1 (block 304) and L2 (block 306). The L1-L2 pair forms an LSSD latch, with the output of L1 feeding the data input of L2. The output of L2 is fed back to the input of L1 through inverter (block 308). This causes the L1-L2-inverter to function as a toggle flip-flop. One advantage here is that the divided versions of C180 (obtained from the output of L1) will never have their edges overlapping with C0, as guaranteed by the splitter operation.

Figure 4:
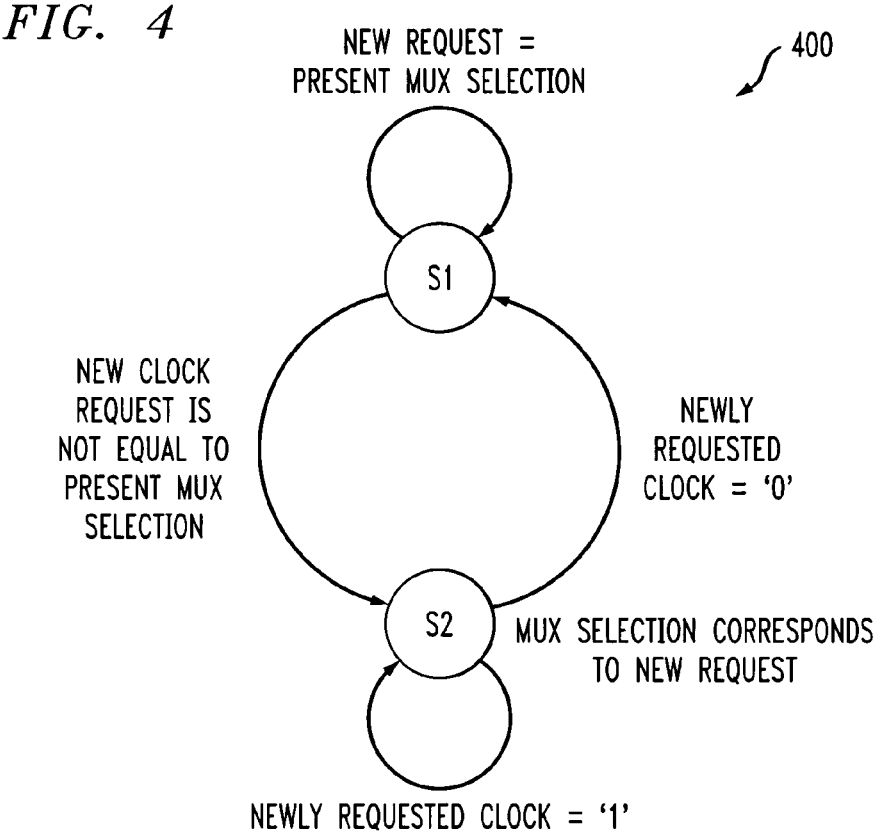
FIG. 4 is a diagram illustrating a representation of a finite state machine, according to an embodiment of the present invention.

Referring now to FIG. 4, a diagram illustrates a representation of a finite state machine, according to an embodiment of the present invention. It is to be appreciated that the finite state machine in FIG. 4 represents one illustrative implementation of finite state machine 110 (FIG. 1). More particularly, FIG. 4 depicts one of the several ways of implementing the state machine used to select the various clocks derived from C180.

State machine 400 starts in state S1, forcing multiplexer 112 (mux) select lines to a predetermined reset or "bring up" value (which can be to select clock C180). The state machine then evaluates the request lines. If the value of the request lines corresponds to the current value of the select lines, the state machine stays in that state. If the value of the request lines corresponds to a request for a new clock (frequency), the state machine switches to state S2. In state S2, the machine evaluates the divided version of C180 which has been requested. When the divided version of C 180 under evaluation goes low, the select lines are changed to force the mux to select the new clock frequency. The machine then returns to state S1.

Figure 5:
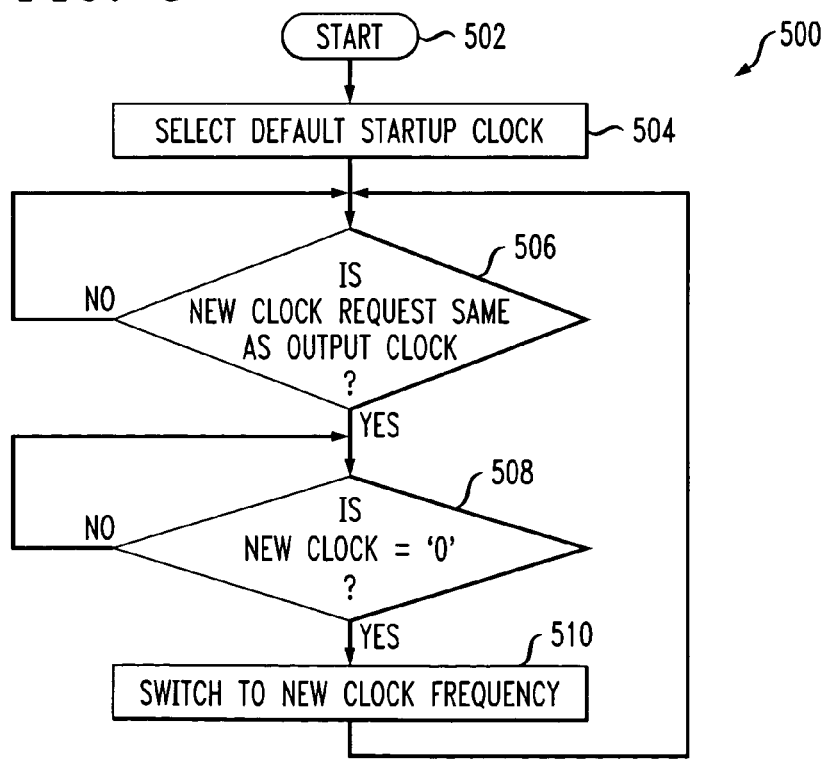
FIG. 5 is a diagram illustrating a clock selection method, according to an embodiment of the present invention.
Figure 6:
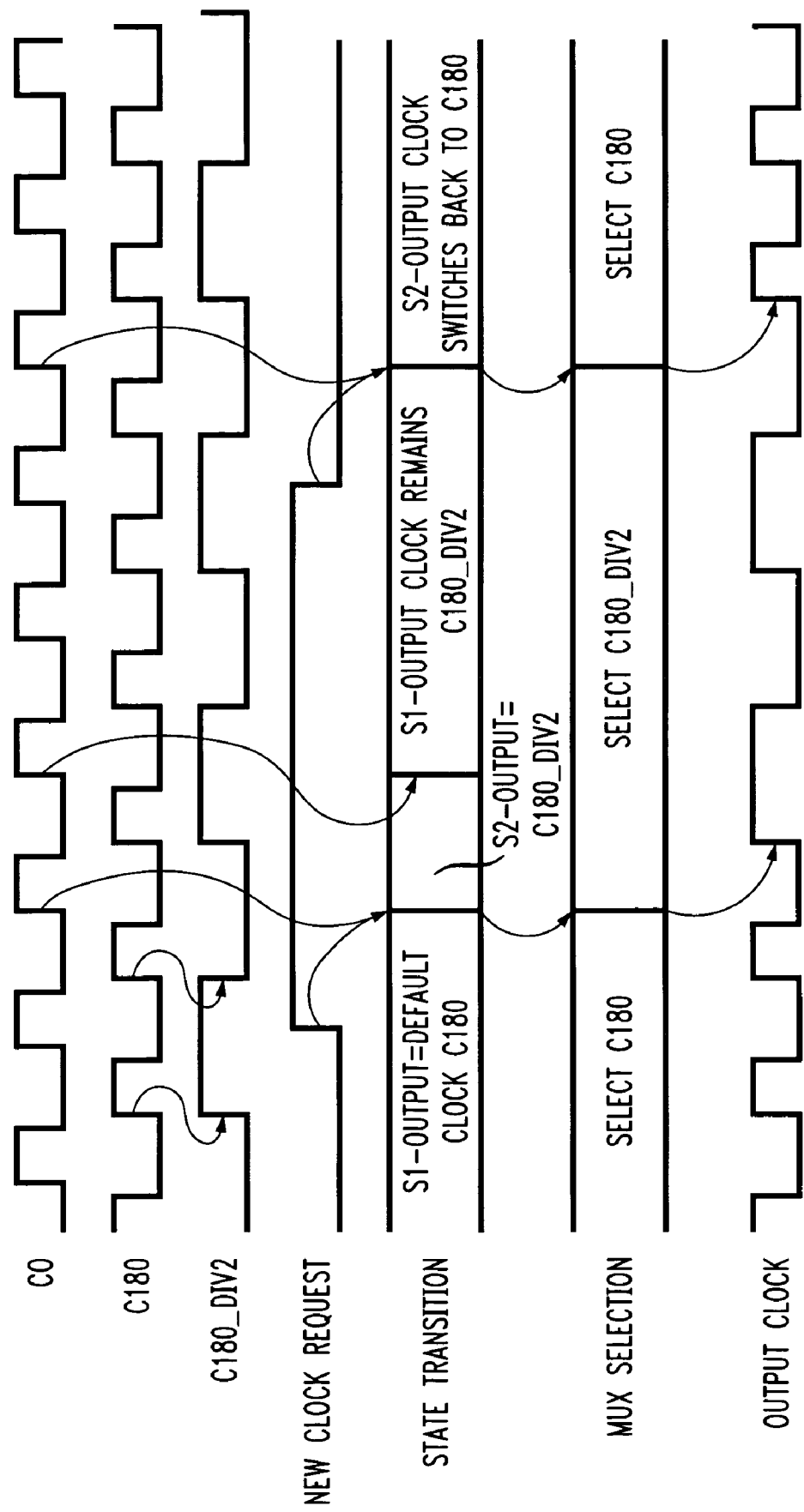
FIG. 6 is a diagram illustrating state transition and timing, according to an embodiment of the present invention.

Techniques of the invention can also be understood using the flow chart of FIG. 5 and timing diagram of FIG. 6.

More particularly, FIG. 5 is a diagram illustrating a clock selection method, according to an embodiment of the present invention. Method 500 starts at block 502. In step 504, the method selects a default output clock (one of the several C180 versions as desired by the application). The method then observes the request lines for a change in output clock frequency (i.e., step 506—is new clock request same as output clock). Upon receiving this request, the method analyzes the new clock signal (one of several C180 versions) for a low state (i.e., step 508—is new clock="0"). When the new clock signal switches to a low state, the method switches the output clock to the new clock (step 510) and goes back to a state where it looks for a new request.

In the timing diagram of FIG. 6, it is explained how the circuit switches from C180 to C180_div2 and back to C180 without any glitches. More particularly, the timing diagram shows non-overlapping C0 and C180 as generated by the splitter. It also shows C 180_div2 which is a divide-by-2 version of C 180.

To explain the state machine operation, consider the startup condition where the output clock is C180. Now, a new clock frequency request comes in, requesting an output clock of C180_div2, as designated by a low to high transition on a "new clock request" line. As the state machine is running on C0, it detects this transition and switches to state S2. It then detects a low on C180_div2 line to switch the clock selection mux (block 112 of FIG. 1). The new clock output is now C180_div2. The state machine then returns to state S1.

Note that the transition of output clock from C180 to C180_div2 took only half the period of C180_div2. Also, as the switch between C180 to C180_div2 and back is performed by a state machine running on C0, the transitions never overlap, thus completely avoiding the possibility of glitching.

Figure 7:
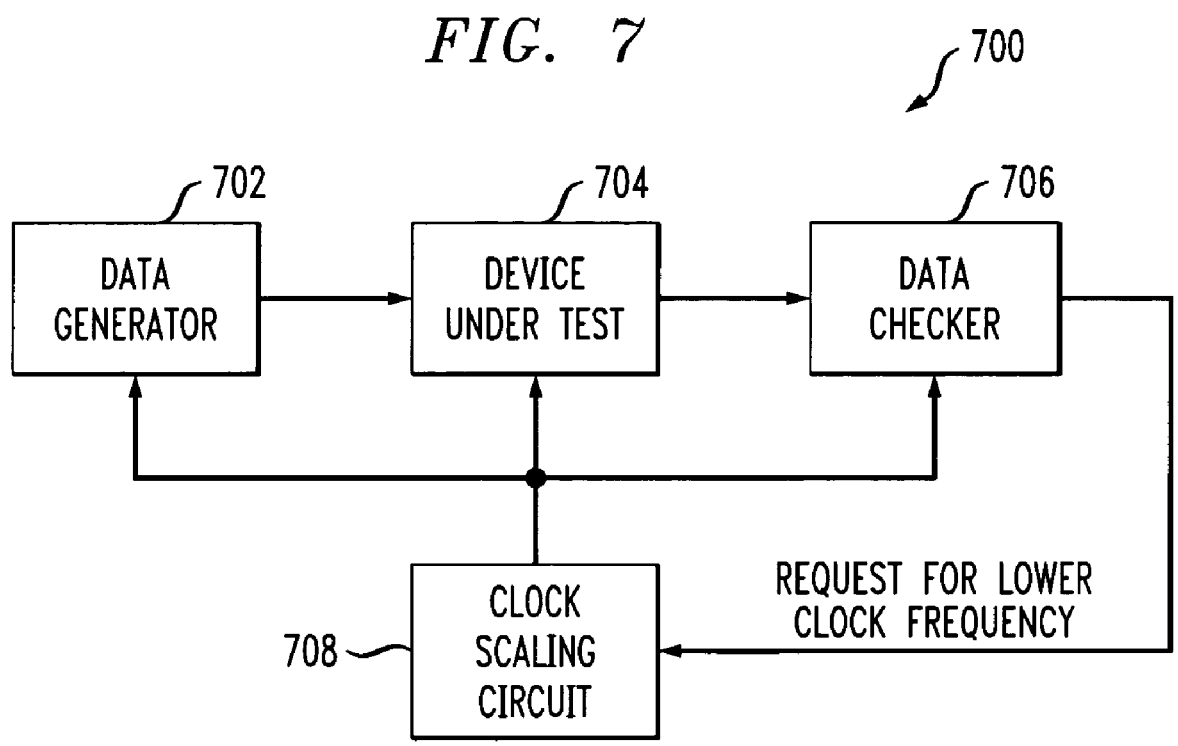
FIG. 7 is a diagram illustrating a built in self test circuit, according to an embodiment of the present invention.

Referring lastly to FIG. 7, a diagram illustrates a built in self test (BIST) circuit, according to an embodiment of the present invention. More particularly, FIG. 7 shows an illustrative representation of a BIST circuit 700 including data generator 702, device under test 704, data checker 706, and clock scaling circuit 708.

Data generator 702 generates patterns to detect dynamic faults in device (i.e., circuit) under test 704. Data checker 706 on detecting faults, requests for a lower clock frequency on which the circuit under test should run. Clock scaling circuit 708, which implements the inventive clock generation and selection techniques described herein, generates a new clock signal, which is provided to the other components of the BIST circuit. The process continues until data checker 706 does not detect any dynamic fault. Thus, the optimum frequency of operation of the device or circuit under test is determined.

Thus, principles of the invention provide a programmable method to vary the operating frequency of a circuit in order to detect dynamic faults, and a programmable method to sort circuits based upon operating frequency based upon dynamic fault detection.

Manufacturing defects are caused by several variations in the chip manufacturing process. Sorting is the process of separating chips with manufacturing defects from those which are defect free. Sorting is usually conducted in two broad stages. The first stage involves identification of static faults. Static faults are manufacturing defects which leave the circuit incapable of performing the desired operation. Chips which are found static fault free are passed to the second stage, i.e., dynamic fault analysis. Dynamic faults cause the circuit to function at a frequency lower than the desired frequency. These are chips are error free at a lower frequency, but start showing erroneous behavior at higher frequencies. Thus, there exists a need to continuously vary the operating frequency of a chip during its dynamic fault analysis. Principles of the present invention provide such a feature.

Consider the circuit of FIG. 7. The data generator can be an on-chip pseudorandom sequence generator, and the data checker can be a pseudorandom sequence checker. For example, a data generator and data checker, such as are disclosed in the U.S. patent application identified as Ser. No. 10/650,222, filed on Aug. 28, 2003, and entitled "Self-Synchronizing Pseudorandom Bit Sequence Checker," the disclosure of which is incorporated by reference herein, may be employed. Alternatively, a wafer level tester such as the Advantest 6672 can be employed. The device under test can be any digital circuit chip.

The data generator loads a pattern sequence into the scan chains of the DUT. The system also uses clock scaling circuit 708 to provide a clock. The clock is allowed to run for a few cycles and then the scan chains are unloaded into the data checker. If the unloaded data pattern does not match an expected pattern, an error has occurred. This error indicates that the DUT is incapable of running at the initial clock frequency generated by block 708. Thus, a request is made for a lower clock frequency from block 708. The cycle continues until all the received patterns match the expected patterns, thus sorting the DUT based upon its dynamic performance.

It is important for the clock scaling circuit to switch without glitches and to switch to the new clock frequency within a half clock period, which is what the inventive clock scaling circuit provides. If the switching takes one or more clock periods of the new clock, as is the case with existing clamping circuits, the contents of the scan chains in the DUT will change causing the received pattern to always mismatch with the expected pattern in the data checker.

It is to be appreciated that the clock generation and selection (i.e., clock scaling) circuits described above may be implemented in accordance with a processor for controlling and performing the various operations described herein, a memory, and an input/output interface. It is to be appreciated that the term "processor" as used herein is intended to include any processing device, such as, for example, one that includes a CPU (central processing unit) and/or other forms of processing circuitry. For example, the processor may be a digital signal processor, as is known in the art. Also the term "processor" may refer to more than one individual processor. The term "memory" as used herein is intended to include memory associated with a processor or CPU, such as, for example, RAM, ROM, a fixed memory device (e.g., hard drive), a removable memory device (e.g., diskette), a flash memory, etc. In addition, the phrase "input/output interface" as used herein is intended to include, for example, one or more mechanisms for inputting data to the processing unit, and one or more mechanisms for providing results associated with the processing unit.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

In any case, it should be understood that the components illustrated in the clock scaling embodiments described above may be implemented in various forms of hardware, software, or combinations thereof, e.g., one or more digital signal processors with associated memory, application specific integrated circuit(s), functional circuitry, one or more appropriately programmed general purpose digital computers with associated memory, etc. Given the teachings of the invention provided herein, one of ordinary skill in the related art will be able to contemplate other implementations of the components of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of switching a frequency associated with a master clock, comprising the steps of:
    generating two phase clocks from a master clock, wherein the two phase clocks do not transition at substantially the same time;
    using one of the two phase clocks to create multiple frequencies by dividing the one phase clock; and
    using the other phase clock to switch between the multiple frequencies of the one phase clock.

2. The method of claim 1, further comprising the step of selecting one of the multiple frequencies of the one phase clock, such that the frequency associated with the master clock is switched to the selected frequency.

3. The method of claim 2, wherein the selecting step is programmable.

4. The method of claim 2, further comprising the step of outputting a new master clock signal at the selected frequency.

5. The method of claim 1, wherein one of the two phase clocks is in phase with the master clock and the other of the two phase clocks is 180 degrees out of phase with the master clock.

6. The method of claim 1, wherein the two phase clocks are non-overlapping.

7. The method of claim 1, wherein the master clock is switched from one clock frequency to a new clock frequency within half the period of the new clock frequency.

8. The method of claim 1, wherein the frequency of the master clock is switched in order to detect at least one dynamic fault.

9. The method of claim 8, wherein circuits are sorted as a function of operating frequency based upon dynamic fault detection.

10. Apparatus for switching a frequency associated with a master clock, comprising:
   a clock splitter for generating two phase clocks from a master clock, wherein the two phase clocks do not transition at substantially the same time;
   multiple clock dividers for creating multiple frequencies by dividing one of the two phase clocks; and
   means for switching between the multiple frequencies of the one of the two phase clocks using the other of the two phase clocks.

11. The apparatus of claim 10, wherein the switching means comprises a finite state machine and a multiplexer.

12. Apparatus for switching a frequency associated with a master clock, comprising:
   a memory; and
   at least one processor coupled to the memory and operative to: (i) generate two phase clocks from a master clock, wherein the two phase clocks do not transition at substantially the same time; (ii) use one of the two phase clocks to create multiple frequencies by dividing the one phase clock; and (iii) use the other phase clock to switch between the multiple frequencies of the one phase clock.

13. The apparatus of claim 12, wherein the at least one processor is further operative to select one of the multiple frequencies of the one phase clock, such that the frequency associated with the master clock is switched to the selected frequency.

14. The apparatus of claim 13, wherein the selecting operation is programmable.

15. The apparatus of claim 13, wherein the at least one processor is further operative to output a new master clock signal at the selected frequency.

16. The apparatus of claim 12, wherein one of the two phase clocks is in phase with the master clock and the other of the two phase clocks is 180 degrees out of phase with the master clock.

17. The apparatus of claim 12, wherein the two phase clocks are non-overlapping.

18. The apparatus of claim 12, wherein the master clock is switched from one clock frequency to a new clock frequency within half the period of the new clock frequency.

19. The apparatus of claim 12, wherein the frequency of the master clock is switched in order to detect at least one dynamic fault.

20. The apparatus of claim 19, wherein circuits are sorted as a function of operating frequency based upon dynamic fault detection.

21. An article of manufacture for switching a frequency associated with a master clock, comprising a machine readable medium containing one or more programs which when executed implement the steps of:
   generating two phase clocks from a master clock, wherein the two phase clocks do not transition at substantially the same time;
   using one of the two phase clocks to create multiple frequencies by dividing the one phase clock; and
   using the other phase clock to switch between the multiple frequencies of the one phase clock.

* * * * *